United States Patent [19]

Vetter et al.

[11] 4,198,235
[45] Apr. 15, 1980

[54] DYE DIFFUSION TRANSFER PROCESS EMPLOYING COMPOUNDS THAT RELEASE SULFONAMIDE DYE PROVIDING RADICALS

[75] Inventors: Hans Vetter, Cologne; Walter Püschel, Leverkusen; Arnfried Melzer, Cologne; Manfred Peters, Leverkusen, all of Fed. Rep. of Germany

[73] Assignee: AGFA-Gevaert, A.G., Fed. Rep. of Germany

[21] Appl. No.: 917,534

[22] Filed: Jun. 21, 1978

Related U.S. Application Data

[63] Continuation-in-part of Ser. No. 654,887, Feb. 3, 1976, abandoned.

[30] Foreign Application Priority Data

Feb. 7, 1975 [DE] Fed. Rep. of Germany ....... 2505248

[51] Int. Cl.² .................. G03C 1/40; G03C 5/54; G03C 1/10
[52] U.S. Cl. ............................... 430/222; 430/559
[58] Field of Search ............. 96/3, 29 D, 56.6, 77, 96/99, 100

[56] References Cited

U.S. PATENT DOCUMENTS

| | | | |
|---|---|---|---|
| 2,698,795 | 1/1955 | Cressman et al. | 96/100 |
| 2,710,803 | 6/1955 | Salminen et al. | 96/56.5 |
| 3,751,406 | 8/1973 | Bloom | 96/29 D |
| 4,053,312 | 10/1977 | Fleckenstein | 96/29 D |
| 4,055,428 | 10/1977 | Koyama et al. | 96/29 D |

OTHER PUBLICATIONS

"Photographic Elements and Processes," Kestner et al., *Research Disclosure* No. 15157, 11/1976, pp.68-74.

*Primary Examiner*—Richard L. Schilling
*Attorney, Agent, or Firm*—Connolly & Hutz

[57] ABSTRACT

Useful non-diffusible dye-giving compounds for the photographic dye diffusion transfer process are dye sulfonamides derived from enolamines or endiamines or tautomers thereof. The dye-giving compounds are oxidized by developer oxidation products and subsequently split under the conditions of alkaline development to release diffusible dyes. The compounds are of the following formula

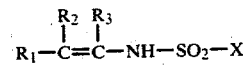

in which X is a dye moiety and $R_1$, $R_2$ and $R_3$ have meanings given hereinafter.

4 Claims, No Drawings

DYE DIFFUSION TRANSFER PROCESS EMPLOYING COMPOUNDS THAT RELEASE SULFONAMIDE DYE PROVIDING RADICALS

This a continuation-in-part of application Ser. No. 654,887, filed Feb. 3, 1976, now abandoned.

This invention relates to a process for the production of colour photographic images on the dye diffusion transfer principle, and to a photographic material suitable for use in this process which contains new, non-diffusible dye-giving compounds.

Among conventional processes for the production of coloured photographic images on the dye diffusion transfer principle, increasing significance has recently been acquired by those processes which are based on the use on non-diffusible dye-giving compounds, from which diffusible dyes or dye precursor products are split off imagewise during development and transferred to an image-receiving layer.

Dye-giving compounds suitable for this purpose are, for example, the non-diffusible colour couplers described in DT-PS 1,095,115 which release a preformed dye, or a dye formed during colour coupling, in diffusible form during development as a result of a reaction with the oxidation product of a colour developer compound consisting of a primary aromatic amine. The choice of the developer compound required is of course limited to colour developers.

In addition, reference is made in this connection to the non-diffusible dye-giving compounds described in DT-OS 1,930,215 in which a preformed latent diffusible dye radical is attached through a splittable hydrazone group to a radical rendering the molecule non-diffusible. These compounds cannot be regarded as colour couplers. It has also been found that the choice of developer compounds required for liberating the diffusible dye radical is by no means confined to the usual colour developers, and black-and-white developers, for example pyrocatechols, are equally suitable instead.

In addition, DT-OS 1,772,929 describes non-diffusible coloured compounds with a special group which, during development, enters into an oxidative ring-closing reaction and, in doing so, releases a preformed dye radical in a diffusible form. The compounds covered by DT-OS 1,772,929 may be divided into two groups. The compounds belonging to the first group require, for development, a normal colour developer compound with whose oxidation product they couple and release the preformed dye radical in diffusible form in a subsequent ring-closing reaction. The compounds belonging to the second group are themselves silver halide developers and, accordingly, are able, even in the absence of further developer compounds in the oxidised form, to enter into the above-mentioned ring-closing reaction by which the diffusible dyes are released.

Finally, reference should also be made at this juncture to the non-diffusible dye-giving compounds disclosed in DT-OS 2,242,762. The compounds in question are sulphonamido phenols and sulphonamido anilines which, after the oxidation reaction which takes place during development, are split under the influence of the developer alkali to release diffusible dyes.

The above-mentioned dye-giving compounds all work negatively. In other words, where normal (negatively working) silver halide emulsions are used, the diffusible dye liberated is distributed imagewise in consistency with the negative silver image produced during development. In order, therefore, to produce positive dye images, it is necessary to use direct-positive silver halide emulsions or, alternatively, to apply a suitable reversal process.

It is difficult to select, from conventional dye-giving compounds, suitable compounds which are satisfactory in every respect both in terms of adequate reactivity and in terms of adequate stability. They should not release the diffusible dyes during the actual alkaline development step, but only as a result of imagewise oxidation through the silver halide developed imagewise. On the other hand, the diffusible dyes should be released sufficiently quickly in the case of imagewise oxidation, in addition to which the diffusible dyes have to be rapidly transferred. Furthermore, the dyes should be able to be adequately fixed in the image-receiving layer and, last but by no means least, should show excellent spectral properties and outstanding stability with respect to light and heat.

The object of the present invention is to provide new non-diffusible dye-giving compounds which combine adequate reactivity with the requisite stability and which, above all, enable a choice to be made from a number of compounds with suitably graduated reactivity through variation of the splittable group.

The present invention relates to a photographic dye diffusion transfer process for the production of coloured images, in which a photographic material having at least one photosensitive silver halide emulsion layer and, associated with that layer, a non-diffusible dye-giving compound which, in oxidised form, is able to release a diffusible dye in an alkaline developer medium, is exposed imagewise and developed with a silver halide developer, the silver halide developer in oxidised form oxidising the dye-giving compound which, as a result of oxidation, is split by the developer alkali to produce an imagewise distribution of the liberated diffusible dye, distinguished by the fact that the non-diffusible dye-giving compound corresponds to the following formula:

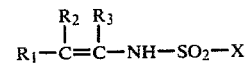

in which
X represents the radical of a dye or dye precursor,
$R_1$ represents $-OR_4$ or $NHR_5$ where $R_4$ is hydrogen or a radical that may be hydrolysed under the conditions of photographic development, for example an acyl radical, and $R_5$ is hydrogen, alkyl, aryl, acyl or a heterocyclic group, said alkyl, aryl, acyl and heterocyclic radicals defined for $R_4$ and $R_5$ include such alkyl, aryl, acyl and heterocyclic radicals which together with one of the substituents $R_2$ and $R_3$ complete a 5-, 6- or 7-membered heterocyclic ring containing at least one oxygen or nitrogen atom;
$R_2$ represents hydrogen, alkyl, aryl or a heterocyclic group including such alkyl, aryl and heterocyclic radicals which together with one of the substituents $R_1$ and $R_3$ complete a 5-, 6- or 7-membered heterocyclic ring or a nitrogen atom carrying two substituents; the first substituent is a radical selected from the group consisting of hydrogen, alkyl, aryl and acyl including such alkyl, aryl and acyl radicals which together with $R_1$ complete a 5-, 6- or 7-membered heterocyclic ring containing at least one nitrogen atom; the second substituent is a radical selected from the group consisting of hydrogen and a radical that together with $R_3$ completes a 5-, 6- or 7-membered heterocyclic ring and preferably a pyrrol, pyrazole or pyridone ring; but the two substituents at the nitrogen atom are not both at the same time hydrogen;

$R_3$ represents hydrogen, alkyl, aryl, a heterocyclic group, acyl, cyano or a radical that together with one of the substituents $R_1$ and $R_2$ completes a 5-, 6- or 7-membered heterocyclic ring;

The alkyl radicals represented by or contained in one or more of the substituents $R_1$, $R_2$ and $R_3$ include straight chain and branched radicals with up to 22 carbon atoms such as methyl, ethyl, isopropyl, tert.-butyl, n-butyl or octadecyl; the alkyl radicals may carry further substituents such as halogen, hydroxyl, alkoxy, carboxyl, sulfo and sulfonyl groups, for example alkylsulfonyl or arylsulfonyl.

The aryl radicals represented by one or more of the substituents $R_1$, $R_2$ and $R_3$ may be phenyl or naphthyl groups and may carry further substituents such as halogen, trifluoromethyl, alkyl, alkoxy, alkylthio, acylamino, acyl, carboxyl or sulfo.

Where not otherwise stated the acyl radicals mentioned above under $R_1$, $R_2$ and $R_3$ are understood to include acyl radicals derived from an aliphatic or aromatic carboxylic or sulfonic acids or from carbonic acid or oxalic acid mono esters or from carbamic or sulfamic acids which may be substituted at the nitrogen with alkyl or aryl.

If $R_4$ represents a radical that is hydrolysed under the conditions of photographic development, it may be any alkali labile or hydrolysable group well known to those skilled in the art, e.g. acetyl, mono-, di- or trichloroacetyl, perfluoracyl, pyruvyl, alkoxy acyl or nitrobenzoyl. The hydrolysable radical $R_4$ may also be a radical which may be present as a substituent in one of the possible groups for $R_2$ and $R_3$. The radical $R_2$ is, for example, a phenyl radical with, in the 2-position, a carbonyl group together with which it formally forms a benzoyl radical ($R_4$).

The heterocyclic radicals represented by or contained in one or more of the substituents $R_1$, $R_2$ and $R_3$ include aromatic heterocyclic radicals such as pyridyl, furyl, thienyl as well as saturated heterocyclic radicals such as piperidyl, pyrolidyl, morpholyl.

Any heterocyclic ring in the dye-giving compounds of the present invention which is completed by two of the substituents $R_1$, $R_2$ and $R_3$ may have condensed to it further rings such as a condensed benzo ring. This may be the case for example if an aryl group or an acyl group such as benzoyl is represented by or contained in one of the substituents $R_1$, $R_2$ and $R_3$ and completes together with one of the other two substituents a heterocyclic ring.

Examples of heterocyclic rings completed by $R_1$ and $R_2$ are phthalyl, imidazoline, benzimidazoline, benzdiazinone (quinazolinone), benzoxazinon, benzthiazole and benzoxazole. Examples of heterocyclic rings completed by $R_2$ and $R_3$ are quinolone, pyridone, indole, pyrrole, pyrazole and coumarin. Indole, pyrrole, pyridone and thiazole are examples of heterocyclic rings completed by $R_1$ and $R_3$. Examples of heterocyclic rings completed by $R_1$, $R_2$ and $R_3$ are fused rings, such as pyrazolobenzimidazole or pyrazoloquinazolone.

Examples of dye-giving compounds of the present invention are those of the following formula II

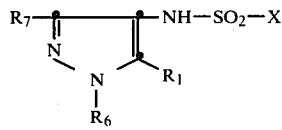

in which $R_1$ is defined as above, $R_6$ represents an aryl such as phenyl or acyl radical, $R_7$ represents an alkyl or alkoxy radical with up to 22 carbon atoms, or an acylamino or arylamino radical; these radicals may have attached to them other radicals which also may be present in the corresponding substituents in pyrazolone color couplers, such as alkoxy, alkylthio, aroxy, sulfo, carboxyl, acylamino, sulfamyl and halogen.

$R_1$ and $R_6$ together may complete a 5- or 6-membered heterocyclic ring, and preferably a benzimidazoline or quinazolinone ring.

Other preferred examples of dye-giving compounds of the present invention are those of the following formula III

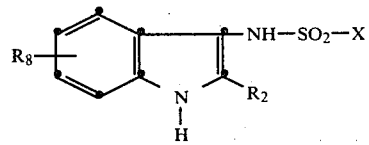

in which $R_2$ represents hydrogen, alkyl, aryl or a heterocyclic group, and $R_8$ represents one or more substituents selected from the group consisting of alkyl such as methyl, isopropyl or tertiary butyl, alkoxy, such as methoxy, halogen such as chloro, sulfamyl in which one or two of the hydrogens on the nitrogen may be substituted by alkyl, or sulfo The compounds according to the invention, which are referred to hereinafter as enolamine or endiamine derivatives, may of course also be present at least partly in their tautomeric form and, accordingly may be formulated as such. However, this does not apply to compounds in which $R_4$ has a meaning other than hydrogen. It is pointed out that the dye-giving compounds according to the invention, as intact molecules, should not diffuse in the layers of the photographic material. To this end, they contain a ballasting radical, for example in one of the radicals $R_1$, $R_2$ and $R_3$.

The dye-giving compounds may be adequately resistant to diffusion even in cases where $R_1$, $R_2$ and $R_3$ do not contain any relatively long alkyl radicals, because, even in this case, the molecule may be sufficiently large, depending upon the dye radical. Otherwise, it is possible to make the dye-giving compounds sufficiently resistant to diffusion by selecting radicals ($R_1$, $R_2$ and $R_3$) of suitable size.

Ballasting radicals are radicals which enable the compounds according to the invention to be incorporated in non-diffusible form in the hydrophilic colloids normally used in photographic materials. Preferred ballasting radicals are organic radicals which generally contain straight-chain or branched aliphatic groups and, optionally, also isocyclic, heterocyclic or aromatic groups generally containing from 8 to 20 carbon aoms. These radicals are attached to the remaining part of the molecule either directly or indirectly, for example through one of the following groups: —NHCO—, —NHSO$_2$—, —NR—, where R is hydrogen or alkyl, —O— or —S—. In the present case at least one of the substituents $R_1$, $R_2$ and $R_3$ or a heterocyclic ring completed by two of these substituents carries a ballasting radical. The ballasting radical may also contain water-solubilising groups such as, for example, sulpho groups or carboxyl groups which may even be present in anionic form. Since the diffusion properties are governed by the size of the molecule of the total compound used, it is sufficient in certain cases, for example if the total molecule used is large enough, to use even shorter-chain radicals as the ballasting radicals.

Suitable dye radicals are, basically, the radicals of dyes belonging to any class, providing they are sufficiently diffusible to be able to diffuse through the layers of the photosensitive material into the image-receiving layer. For this purpose, the dye radicals may be provided with one or more water-solubilising groups. Suitable water-solubilising groups are, inter alia, carboxyl groups, sulpho groups, sulphonamide groups and aliphatic or aromatic hydroxyl groups. However, the sulphonamide group remaining in the dye after splitting leaves the dye molecule with a considerable tendency towards diffusion in alkaline medium, so that the presence of additional water-solubilising groups is not absolutely essential. Examples of dyes particularly suitable for use in the process according to the invention are azo dyes, azomethine dyes, anthraquinone dyes, phthalocyanine dyes, indigoid dyes, triphenyl methane dyes, and also metal complex dyes and coloured metal complexes.

In the context of the invention, residues of dye precursors are the residues of compounds which are converted into dyes during photographic processing by the usual or by additional processing stages, whether by oxidation, by coupling or by liberating an auxochromic group in a chromophoric system, for example by hydrolysis. Dye precursors corresponding to this definition may be leuco dyes, couplers or even dyes which are converted into other dyes during processing. Providing a distinction between dye radicals and the radicals of dye precursors is not of essential significance, dye precursors are also intended to be covered by the generic expression "dye radicals" used hereinafter.

Formula examples:

The following are examples of suitable dye-giving compounds according to the invention:

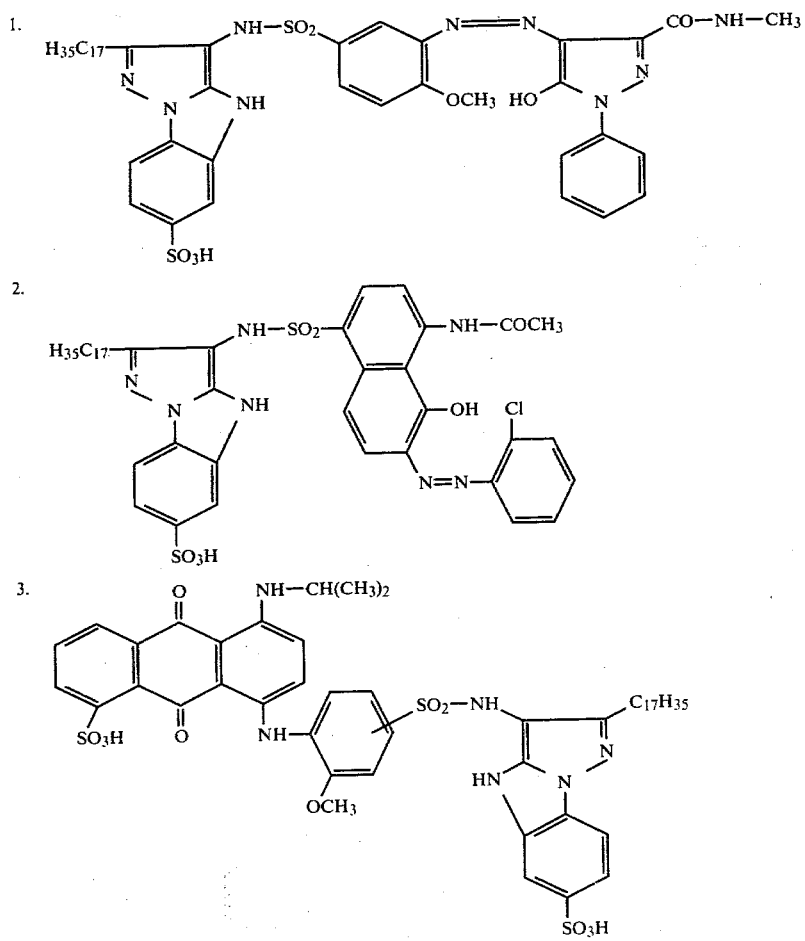

4.
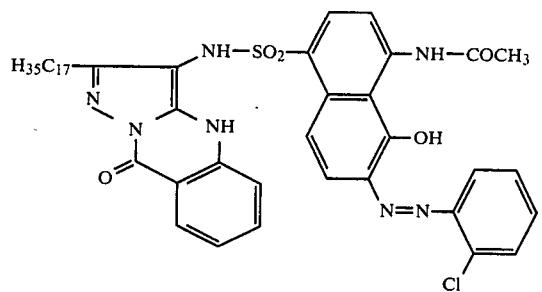
5.
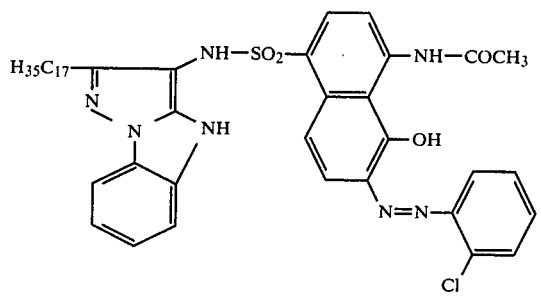
6.
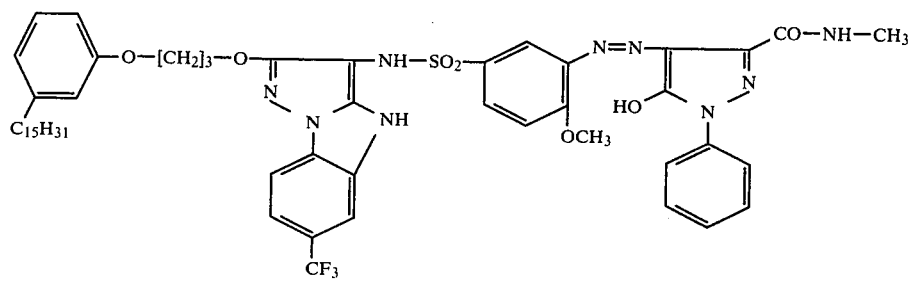
7.
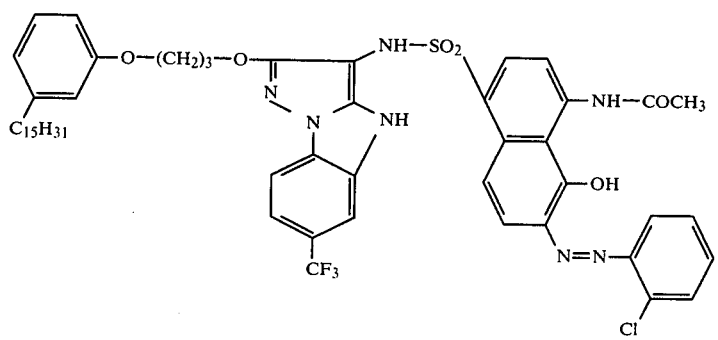
8.
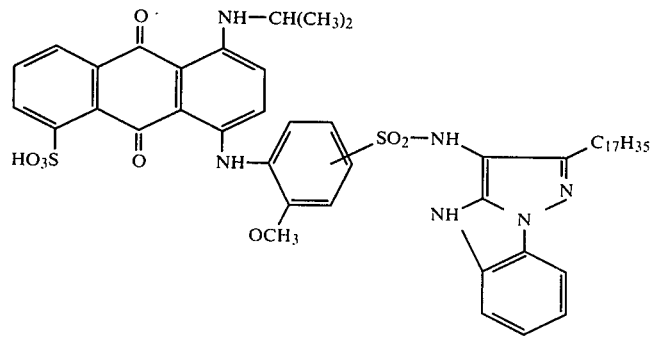

-continued
9. 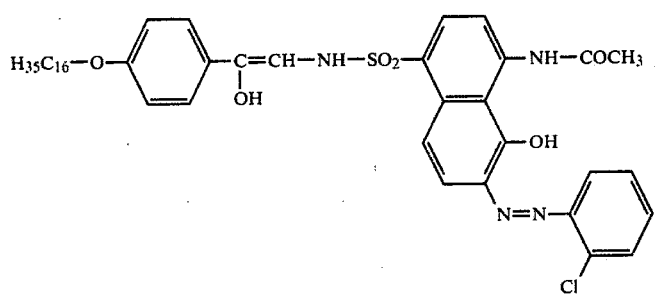
10. 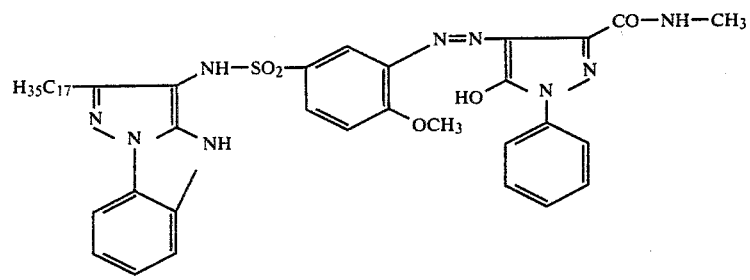
11. 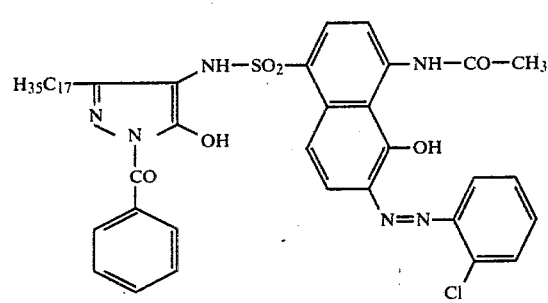
12. 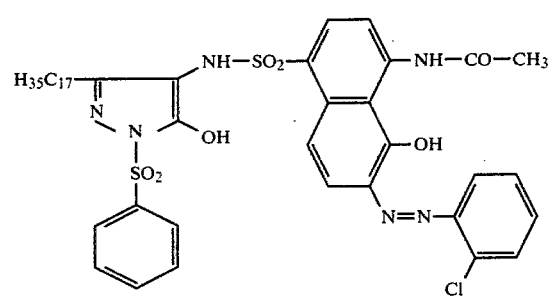
13. 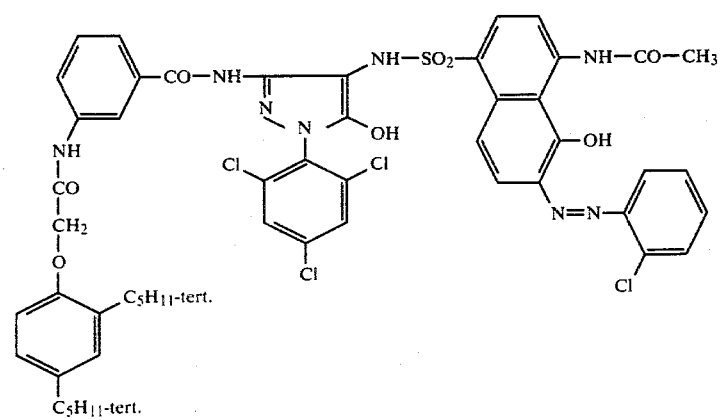

-continued
14.
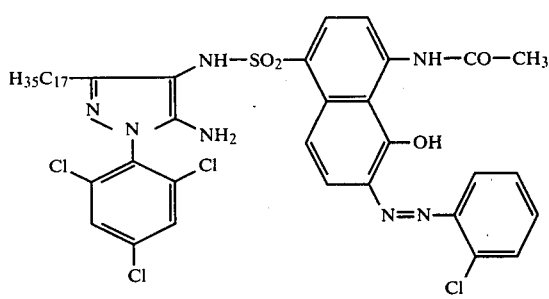
15.
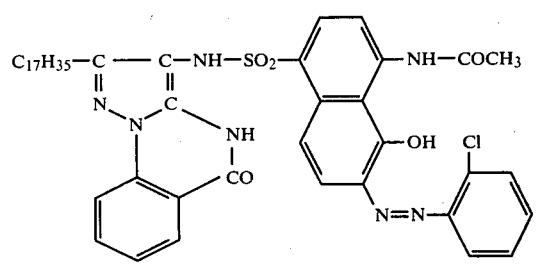
16.
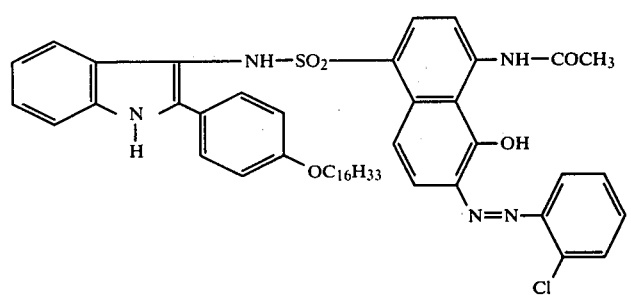
17.
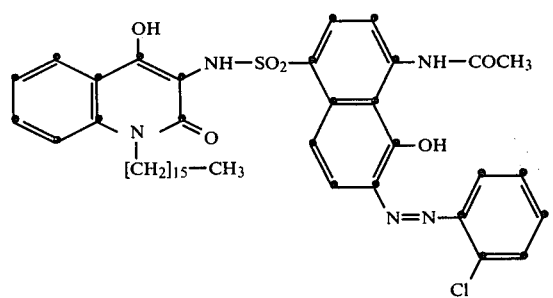
18.
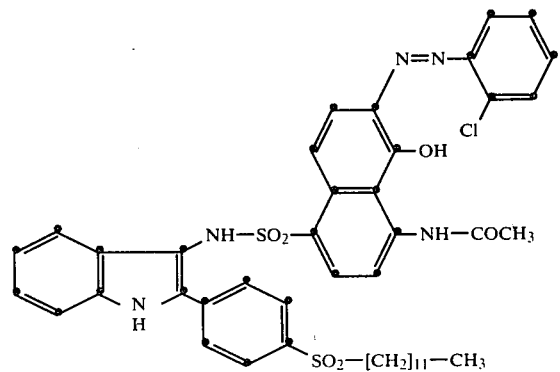

-continued
19.
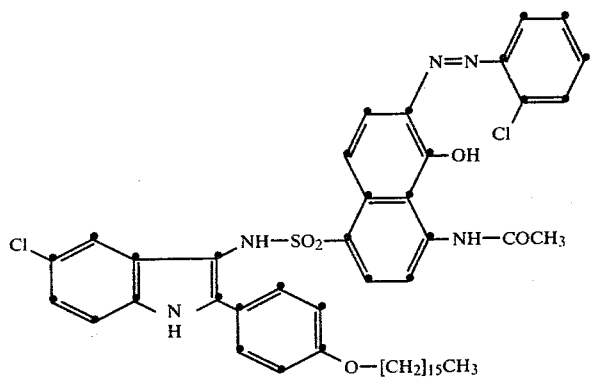
20.
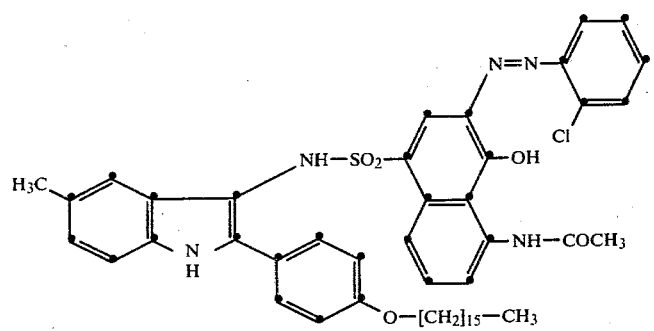
21.
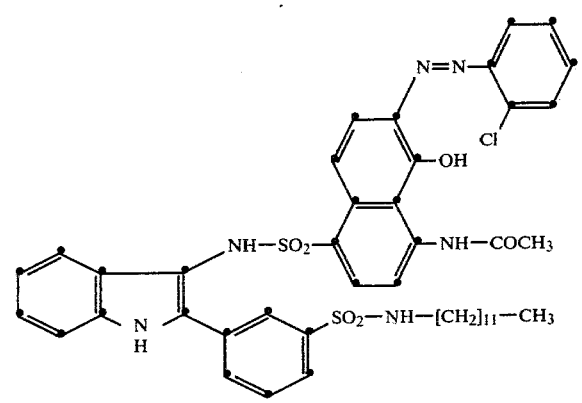
22.
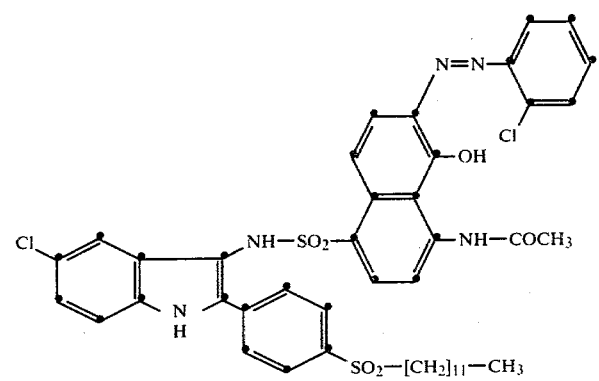

23. 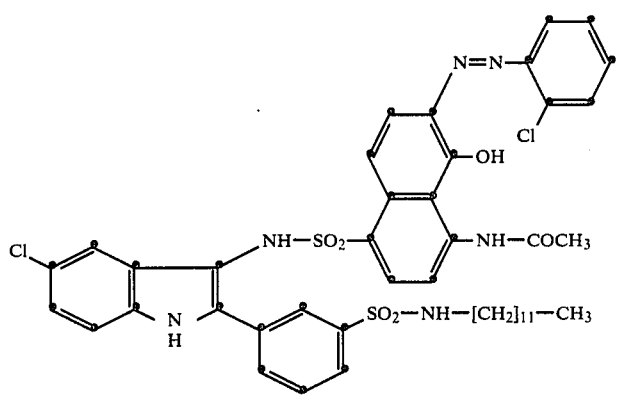
24. 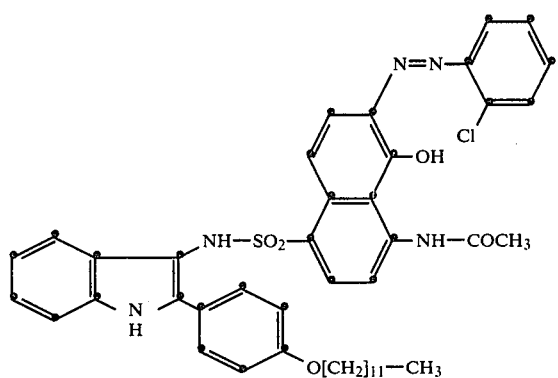
25. 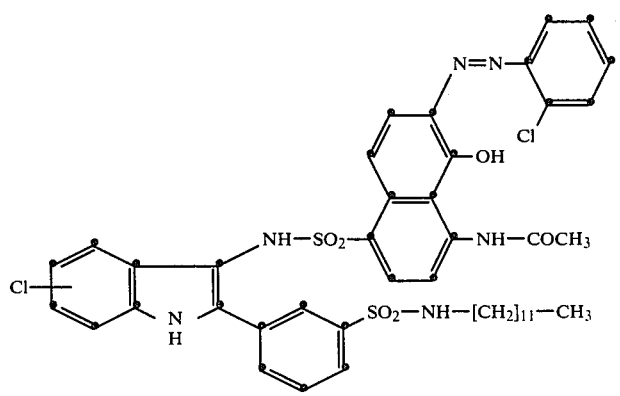
26. 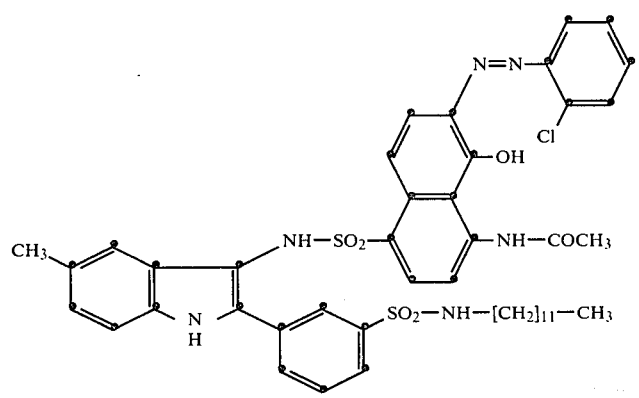

-continued
27. 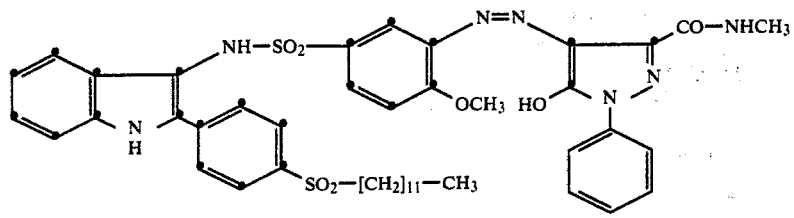
28. 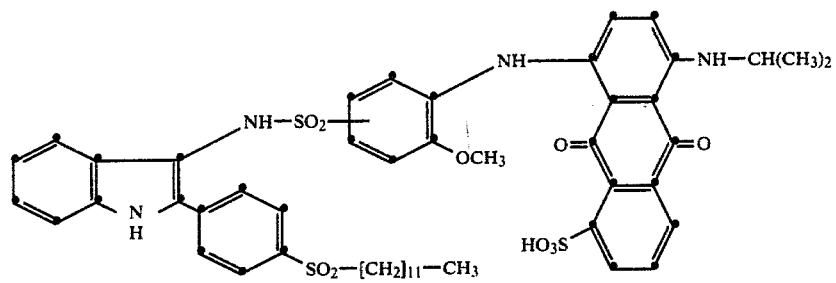
29. 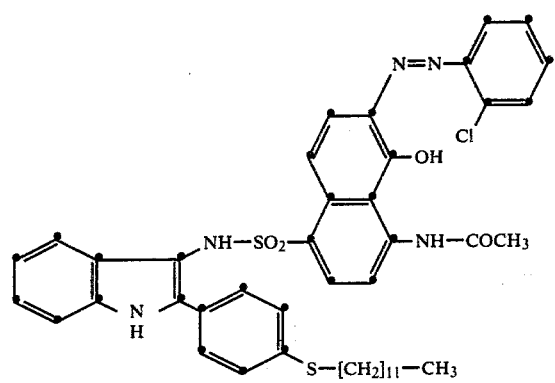
30. 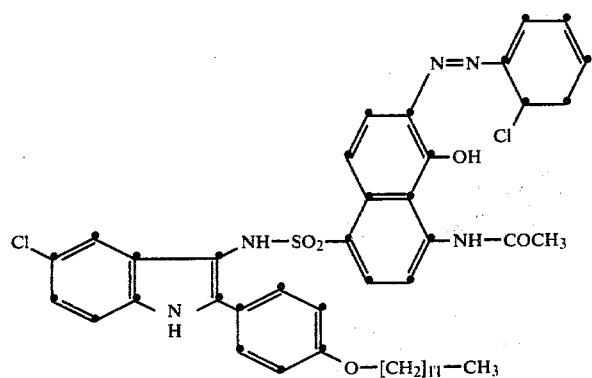
31. 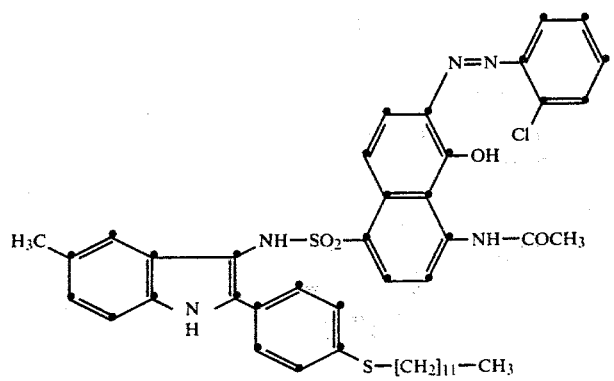

32. 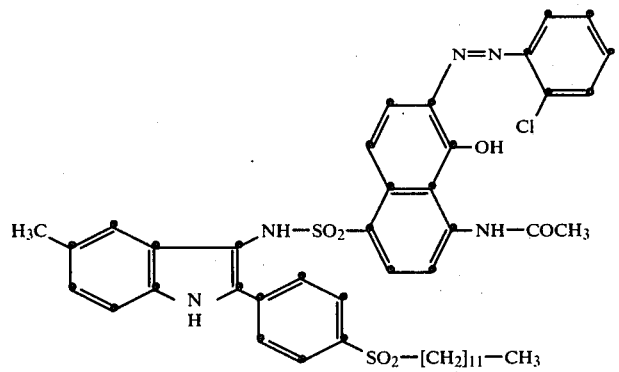
33. 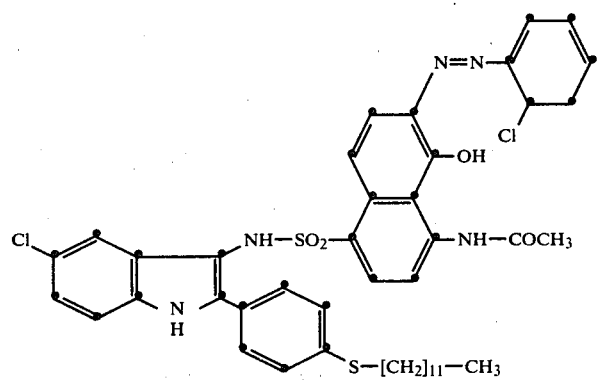
34. 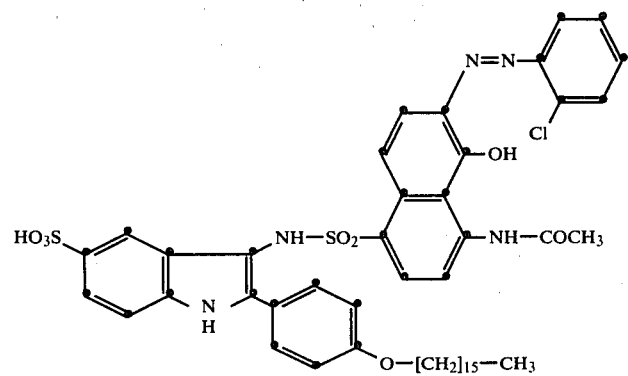
35. 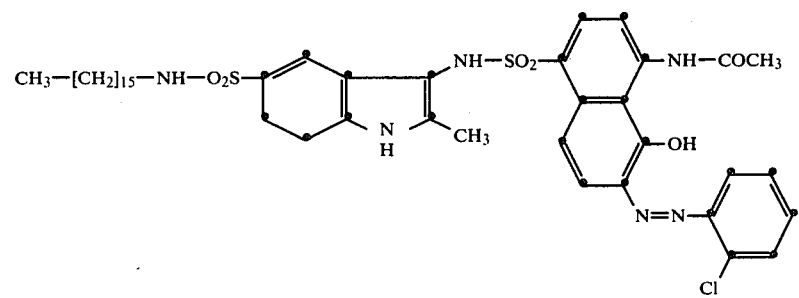
36. 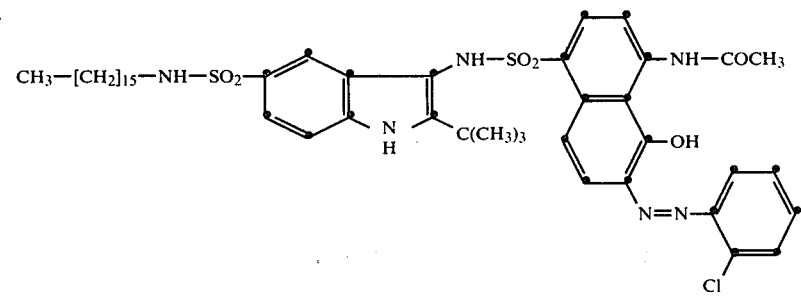

37.

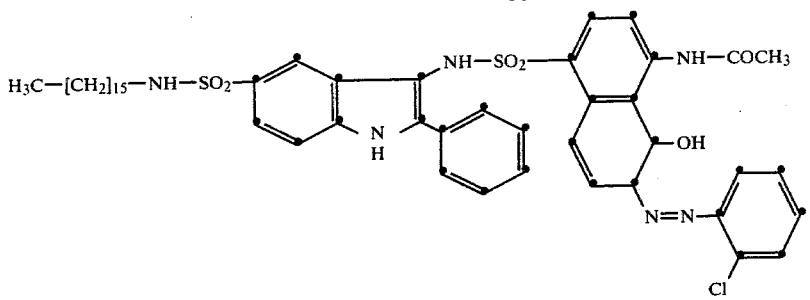

Preparation of dye-giving compound 2

4.9 g of compound (I), whose production is described hereinafter, were suspended in 50 ml of pyridine, followed by the addition of 4.3 g of the dye sulphochloride:

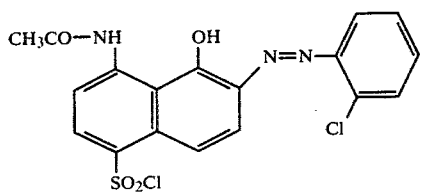

The solution was heated to 45° C. and then left to cool. Following the addition of 50 ml of water, the solution was stirred for 1 hour. The precipitate was filtered off under suction and washed with water. The residue was suspended in acetone, filtered under suction, washed with acetone and dried.

Yield: 5.2 g of compound 2.

Compound (I) corresponding to the formula:

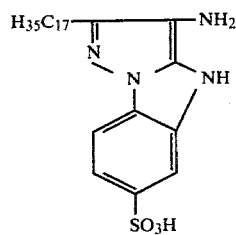 (I)

was obtained as follows:

20.7 g of the pyrazolobenzimidazole corresponding to the formula:

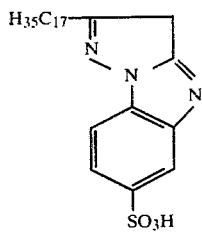

were suspended in 150 ml of glacial acetic acid, followed by the dropwise addition at room temperature of a solution of 3.3 g of $NaNO_2$ in 12 ml of water. The suspension was then stirred for 2 hours and subsequently introduced into a solution of 22.6 g of Na-dithionite in 150 ml of water, followed by stirring for 30 minutes. After filtration under suction, the product was washed with water. The residue was suspended in 250 ml of methanol, followed by the addition of 250 ml of water. The product was then heated to boiling point, cooled, filtered under suction, washed with methanol and dried under nitrogen.

Yield: 18.2 g.

Compounds 1 and 3 are obtained in the same way as compound 2 by reacting compound (I) with the dye sulphochlorides corresponding to the formulae:

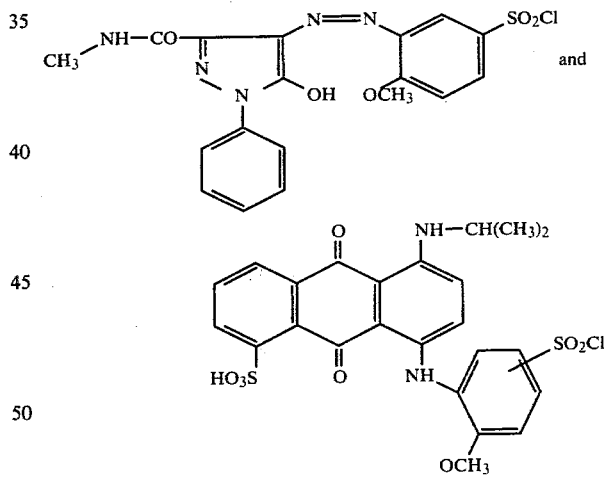

Production of dye-giving compound 4

4.4 g of compound (II), whose production is described hereinafter, were suspended in 50 ml of pyridine, followed by the addition of 4.3 g of the dye sulphochloride used for the production of compound 2. The mixture was heated to 40° C. until a solution was formed, stirred for 15 minutes at 40° C., and then cooled. 50 ml of water were added dropwise, and the precipitate was filtered off under suction and washed with water. The residue was suspended in acetone, filtered under suction, washed with a little acetone and dried.

Yield: 5 g of compound 4.

Compound (II) corresponding to the formula:

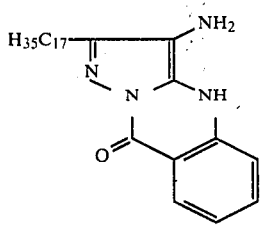

(II)

was obtained as follows:

6.2 g of compound (III) (for production see below) were suspended in 170 ml of glacial acetic acid, followed by the addition in portions of 9 g of zinc dust. The whole was stirred for 1 hour at room temperature and then for 30 minutes at 40° C., filtered under suction and washed with glacial acetic acid. The mother liquor was concentrated in vacuo and the greasy residue was stirred with 50 ml of methanol, filtered under suction, washed with methanol and dried under nitrogen.

Yield: 5 g of compound (II).

Compound (III) corresponding to the formula:

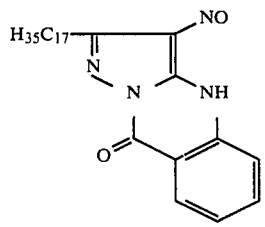

(III)

was prepared as follows:

9 g of the pyrazoloquinazolone:

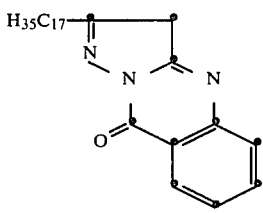

were suspended in 75 ml of glacial acetic acid, after which 1.65 g of NaNO$_2$ were added and the mixture stirred for 4 hours with a positive nitrite reaction. After standing overnight, the product was filtered off under suction, washed with H$_2$O and dried.

Yield: 7.7 g of compound (III).

Production of dye-giving compound 9

4.9 g of the dye sulphochloride used for the production of compound 2 were briefly boiled with stirring in 70 ml of anhydrous chloroform and 3.55 ml of anhydrous pyridine, followed by the addition of 5.0 g of 4-hexadecyloxy-ω-aminoacetophenone hydrochloride. After boiling for a further two hours, the product was cooled. After undissolved components had been filtered off under suction, the solution was stirred twice with 10 g of Kieselgel G, a product of the Merck Company, Darmstadt, and then filtered under suction. The silica gel residues were extracted with a little CCl$_4$. The combined CHCl$_3$ and CCl$_4$ solutions were concentrated by evaporation in vacuo, and the residue was stirred with a little petroleum ether, filtered under suction and dried.

Yield: 1.7 g of compound 9. 4-hexadecyloxy-ω-aminoacetophenone hydrochloride was obtained as follows:

72 g of 4-hexadecyloxy acetophenone were dissolved in 350 ml of glacial acetic acid at 50° C. 32 g of bromine were added dropwise with stirring in such a way that the internal temperature remained at 50° C. in the absence of heating. On continued stirring in the absence of heat, a deposit was precipitated. The deposit was filtered off under suction at room temperature, washed with water, dried in vacuo over KOH and dissolved in 250 ml of chloroform. The solution was freed from residual water with Na$_2$SO$_4$ sicc. and filtered, followed by the addition of 28 g of hexamethylene tetramine. After standing overnight, the hexamethylene tetramine hydrobromide precipitated was filtered off under suction and substantially twice the volume of ethyl acetate was added to the filtrate. The precipitate was filtered off under suction, washed with ethyl acetate and dried. Yield: 51 g.

The product thus obtained was dissolved under heat in 840 ml of ethyl glycol, followed by the addition at room temperature of 24.6 ml of concentrated hydrochloric acid. After a few hours' stirring at room temperature, complete dissolution occurred, followed by the gradual precipitation of a solid product. After standing overnight, the product was filtered under suction and dried. Yield: 34.2 g. Further material, if any, may be precipitated from the mother liquor with acetonitrile. It is of course possible to apply other methods which lead to the compounds according to the invention. For example, suitable compounds may be coupled with diazonium salts, reduced by known methods to form the corresponding enolamines or endiamines or their tautomers and reacted with dye sulphochlorides to form the compounds according to the invention.

The dye-giving compounds according to the invention are incorporated by any of the usual methods in casting solutions for the layers of the photographic material. The quantity of dye-giving compound used per liter of casting solution varies within relatively wide limits, the most favourable concentration being determined by simple tests. For example, from 5 to 80 g and preferably from 20 to 40 g of the dye-giving compound are used per liter of the solution.

The association between the non-diffusible dye-giving compound and silver halide which is necessary for obtaining the required effect may be obtained, for example, by introducing the non-diffusible compounds into the casting solutions from aqueous-alkaline solutions utilising the water-solubilising groups present. However, the non-diffusible dye-giving compounds may also be introduced into the layers by any of the known emulsification processes. Processes of this kind are described, for example, in British Patent Specifications Nos. 791,219 and 1,099,414 to 1,099,417. It is also possible to prepare aqueous dispersions of the dye-giving compounds and to add them to the particular casting solutions. To this end, aqueous suspensions of the dye-giving compound are finely ground, for example by intensive stirring in the presence of sharp-edged sand or by applying ultrasonics. In another embodiment, it may be desirable for example to incorporate the dye-giving compounds together with silver halide and, optionally, developer substances in the layer in the form of so-called micro capsules, in which case two or more differently sensitised photosensitive silver halide emulsions and the corresponding non-diffusible compounds may be combined in a single layer in the manner of so-called mixed-grain emulsions, as described for example in U.S. Pat. Spec. No. 2,698,794. The non-diffusible dye-giving compounds may be accommodated in a photosensitive layer itself or in an adjoining layer. For example, a compound releasing a blue-green dye is associated with the red-sensitive layer, a compound releasing a magenta dye is associated with the green-sensitive layer and a compound releasing a yellow dye is associated with the blue-sensitive layer.

In the context of the invention, "association" and "associated" mean that the mutual arrangement of silver halide emulsion and dye-giving compound is such that they may interact to allow imagewise consistency between the silver image formed and the imagewise distribution of the diffusible dye liberated. The associated dye-giving compound is best incorporated in the silver halide emulsion itself or in a layer adjacent to the silver halide emulsion layer, this adjacent layer preferably lying behind the silver halide emulsion layer (as seen in the direction of the incident light during exposure).

The dye-giving compounds according to the invention are oxidised imagewise by developer oxidation products during development of the silver image and, under the influence of the developer or activator alkali, subsequently undergo a splitting reaction in which the dye radicals are liberated in diffusible form as dye sulphonamides. The usual photographic developer compounds may be used for development providing they are able in oxidised form to oxidise the dye-giving compounds according to the invention. The following are examples of suitable developers:

hydroquinone
N-methyl aminophenol
1-phenyl-3-pyrazolidone
1-phenyl-4,4-dimethyl-3-pyrazolidone aminophenols
N,N-diethyl-p-phenylene diamine
N-ethyl-N-hydroxyethyl-p-phenylene diamine
3-methyl-N,N-diethyl-p-phenylene diamine
N,N,N',N'-tetraalkyl-p-phenylene diamines, such as tetramethyl-p-phenylene diamine, triethyl sulphobutyl-p-phenylene diamine and 1,4-bis-pyrrolidinobenzene, and reductones It is expressly pointed out that the choice of developer substances in the process according to the invention is not confined to colour developers. Instead conventional black-and-white developers may also be used, which may be regarded as an advantage by virtue of the lesser tendency of black-and-white developers towards discoloration. The developers may actually be present in the layers of the colour photographic material where they are activated by the alkaline activator liquid, or in the alkaline processing liquid or paste. Since the dye-giving compounds according to the invention themselves have developer properties, there is no need in individual case to use auxiliary developer compounds. In cases such as these, the dye-giving compound is directly oxidised by developable silver halide.

Since the imagewise distribution of the diffusible dye released during development is consistent with the developed silver image, it is necessary, in order to produce positive coloured transfer images, to use direct-positive silver halide emulsions or, in cases where conventional negative emulsions are used, to apply a suitable reversal process.

A reversal process of this kind is available in the silver salt dispersion process. Photographic reversal by means of the silver salt diffusion process for producing positive coloured images using conventional colour couplers is described, for example, in U.S. Pat. No. 2,763,800. Replacement of the colour couplers by the above-mentioned dye-giving compounds gives a photosensitive element which is suitable for the dye diffusion transfer process. A photosensitive element of this kind comprises, for example, at least one combination of a photosensitive silver halide emulsion layer and, associated therewith, a binder layer containing development nuclei for the physical development process and a dye-giving compound.

During development, the exposed part of the silver halide is chemically developed in the photosensitive silver halide emulsion layer. The unexposed part is transferred by means of a silver halide solvent to the associated binder layer containing development nuclei where it is physically developed. In cases where physical development is carried out with a developer which, in oxidised form, is able to release a diffusible dye as a result of a reaction with the dye-giving compound present in this layer, diffusible dyes are distributed imagewise and may be transferred to an imgae-receiving layer where they form a positive coloured image.

In cases where reversal is carried out with compounds which release development inhibitors in imagewise arrangement, the photosensitive element consists of at least one layer combination of a photosensitive silver halide emulsion layer and a second emulsion layer which can be developed without exposure and which contains the dye-giving compound. The photosensitive silver halide emulsion layer is developed for example with colour developers in the presence of certain compounds which release development-inhibiting substances during the reaction with oxidised colour developer. The development-inhibiting substances released imagewise in the photosensitive layer diffuse into the adjacent emulsion layer developable without exposure where they inhibit development in an imagewise distribution. The non-inhibited (positive) parts of the emulsion layer developable without exposure are developed by the residual developer whose oxidation products subsequently react with the non-diffusible dye-giving compounds according to the invention to release diffusible dyes which are transferred imagewise to the image-receiving element. Suitable compounds which release development-inhibiting substances on reaction with colour developer oxidation products are, for example, the known DIR couplers (DIR=development inhibitor releasing), which are colour couplers containing a releasable inhibitor radical in the coupling position. DIR couplers of this kind are described, for example, in U.S. Pat. No. 3,227,554.

Another group of compounds which release development-inhibiting substances on reaction with colour developer oxidation products is described in U.S. Pat. No. 3,632,345. These compounds are not colour couplers. Accordingly, no dyes are formed on the release of the development-inhibiting substances. Finally, according to DT-PS 1,229,389, it is also possible in a process of this kind to use suitable substituted non-diffusible hydroquinone compounds which are oxidised into the corresponding quinones on reaction with developer oxidation products, releasing development-inhibiting mercaptans.

In principle, suitable direct-positive silver halide emulsions are any direct-positive silver halide emulsions which need only be developed once to produce a positive silver image and an imagewise distribution of developer oxidation products corresponding to this positive silver image. For example, it is possible to use silver halide emulsions in which exposure to light or chemical treatment has resulted in the formation of a developable fog which is destroyed imagewise during imagewise exposure under certain conditions. The fog remains intact at the unexposed areas, so that a direct-positive silver image is obtained during subsequent development and, in consistency therewith, an imagewise distribution of diffusible dye is formed when a dye-giving compound according to the invention is associated with the direct-positive silver halide emulsion.

Another group of direct-positive silver halide emulsions which may be used in accordance with the invention comprises the so-called unfogged direct-positive silver halide emulsions which are photosensitive predominantly inside the silver halide grains. When emulsions of this kind are exposed imagewise, a latent image is formed predominantly inside the silver halide grains. However, the development of unfogged direct-positive silver halide emulsions of this kind is carried out under fogging conditions where a fog is produced predominantly at the unexposed areas and a positive silver image is developed during development. The unfogged direct-positive silver halide emulsions are characterised by the fact that, when developed with a typical surface developer of the following composition:

| p-hydroxy phenyl glycine | 10g |
| sodium carbonate (crystallised) | 100g |
| made up with water to | 1000ml | exposed samples preferably form no silver image, or only a silver image of very low density, whereas in cases where an internal developer of the following composition:

| hydroquinone | 15g |
| monomethyl-p-aminophenolsulphate | 15g |
| sodium sulphite (anhydrous) | 50g |
| potassium bromide | 10g |
| sodium hydroxide | 25g |
| sodium thiosulphate (crystallised) | 20g |
| made up with water to | 1000ml | is used, a silver image of adequate density is formed.

Selective fogging of the unfogged direct-positive emulsions which have been exposed imagewise may be carried out before or during development by treatment with a fogging agent. Suitable forming agents are reducing agents, such as hydrazine or substituted hydrazines. In this connection, reference is made, for example to U.S. Pat. No. 3,227,552.

Unfogged direct-positive emulsions are, for example those which show faults inside the silver halide grains (U.S. Pat. No. 2,592,250), or silver halide emulsions with a layered grain structure (DT-OS 2,308,239).

The emulsions may also be chemically sensitised, for example by the addition during chemical ripening of sulphur-containing compounds, for example allyl isothiocyanate, allyl thiourea, sodium thiosulphate and the like. Other suitable chemical sensitisers are reducing agents, for example the tin compounds described in Belgian Pat. Specifications Nos. 493,464 and 568,687, and polyamines such as diethylene triamine or amino methane sulphinic acid derivatives, for example according to Belgian Pat. Specification No. 547,323.

Other suitable chemical sensitisers are noble metals and noble metal compounds, such as gold, platinum, palladium, iridium, ruthenium or rhodium. This method of chemical sensitisation is described in the Article by R. Koslowsky, in Z. Wiss Phot. 46, 65–72 (1951).

The emulsions may also be sensitised with polyalkylene oxide derivatives, for example with polyethylene oxide with a molecular weight of from 1000 to 20,000, and with condensation products of alkylene oxides and aliphatic alcohols, glycols, cyclic dehydration products of hexitols, with alkyl-substituted phenols, aliphatic carboxylic acids, aliphatic amines and aliphatic diamines. The condensation products have a molecular weight of at least 700, preferably more than 1000. In order to obtain special effects, it is of course possible to use these sensitizers in combination with one another, as described in Belgian Pat. Specification No. 537,278 and in British Pat. Specification No. 727,982.

The emulsions may also be spectrally sensitised, for example by the usual monomethine or polymethine dyes, such as acid or basic cyanines, hemicyanines, streptocyanines, merocyanines, oxonols, hemioxonols, styryl dyes or other even trinuclear or polynucelar methine dyes, for example rhodacyanines or neocyanines. Sensitisers of this kind are described, for example in F. M. Hamer's book "The Cyanine Dyes and Related Compounds" (1964), Interscience Publishers, John Wiley and Sons.

The emulsions may contain the usual stabilisers such as, for example, homeopolar or salt-like compounds of mercury with aromatic or heterocyclic rings, such as mercaptotriazoles, single mercury salts, sulphonium-mercury double salts and other mercury compounds. Other suitable stabilisers are azaindenes, preferably tetra- or pentaazaindenes, more especially those substituted by hydroxyl or amino groups. Compounds of this kind are described in the Article by Birr in Z. Wiss. Phot. 47, 2–27 (1952). Other suitable stabilisers are inter alia heterocyclic mercapto compounds, for example phenyl mercaptotetrazole, quaternary benzthiazole derivatives, benztriazole and the like.

Gelatin is preferably used as the binder for the photographic layers. However, it may be completely or partly replaced by other natural or synthetic binders. Examples of natural binders are alginic acid and its derivatives, such as its salts, esters or amides, cellulose derivatives, such as carboxy methyl cellulose, alkyl cellulose, such as hydroxy ethyl cellulose, and starch or its derivatives, such as ethers or esters or caragenates. Examples of synthetic binders are polyvinyl alcohol, partially hydrolysed polyvinyl acetate, polyvinyl pyrrolidone and the like.

The layers may be hardened in the usual way, for example with formaldehyde or halogen-substituted aldehydes containing a carboxyl group, such as mucobromic acid, diketones, methane sulphonic acid esters or dialdehydes. Also other hardeners may be used as for example fast acting hardeners such as carbodiimide hardeners, carbamoyl pyridinium salts and carbamoyloxypyridinium salts. Reference is made in this respect to German Offenlegungsschriften 2,263,602; 2,225,230 and 1,808,685.

The dye diffusion transfer process according to the invention is carried out with a photosensitive element containing one or more silver halide emulsion layers and the non-diffusible dye-giving compounds associated therewith, and with an image-receiving element in which the required dye image is produced by the diffusible dyes transferred imagewise. To this end, the photosensitive element and the image-receiving element must be in firm contact with one another for at least a finite period during the development time, so that the imagewise distribution of diffusible dyes, produced in the photosensitive element in consequence of development, can be transferred to the image-receiving element. Contact may be established after development has started. Alternatively, it may even be established before the beginning of development. This is the case, for example, where the dye diffusion transfer process is carried out with a material in which the photosensitive element and the image-receiving element form an integral unit, hereinafter also referred to as one-sheet material, which remains intact even after development is over. In other words, the photosensitive element is not separated from the image-receiving element, even after dye transfer. An embodiment of this kind is described, for example in DT-OS 2,019,430.

A one-sheet material suitable for carrying out the dye diffusion transfer process according to the invention comprises, for example, the following layer elements:

(1) a transparent layer substrate
(2) an image-receiving layer
(3) a light-impermeable layer
(4) a photosensitive element with at least one photosensitive silver halide emulsion layer and at least one non-diffusible dye-giving compound associated therewith
(5) a retarding layer
(6) an acid polymer layer
(7) a transparent layer substrate The one-sheet material may be assembled by separately producing two different parts, namely the photosensitive part (layer elements 1 to 4) and the cover sheet (layer elements 5 to 7) which are then placed layerwise on one another and joined together, optionally using spacer strips, so that a space large enough to accommodate a measured quantity of a working liquid is formed between the two parts. The layer elements 5 and 6, which together form the neutralisation system, may also be arranged, although with the sequence reversed, between the layer substrate and the image-receiving layer of the photosensitive part.

Means may be provided for introducing a working liquid between the photosensitive part and the cover sheet, for example in the form of a laterally arranged splittable container which, under the action of mechanical forces, releases its contents between two adjacent layers of the one-sheet material.

An important part of the photographic material according to the invention is the photosensitive element which, in the case of a one-dye transfer process, contains a photosensitive silver halide emulsion layer and, associated therewith, a non-diffusible dye-giving compound. The non-diffusing compound may be situated in a layer adjacent to the silver halide emulsion layer, or in the silver halide emulsion layer itself, in which case the colour of the image dye is preferably selected in such a way that the predominant absorption range of the dye-giving compound is not consistent with the predominant sensitivity range of the silver halide emulsion layer. However, in order to produce multicoloured transfer images in natural colours, the photosensitive element contains three such associations of dye-giving compound and photosensitive silver halide emulsion layer, in which case the absorption range of the colouring compound is generally substantially consistent with the spectral sensitivity range of the associated silver halide emulsion layer. In this case, however, the colouring combination must be arranged in a separate binder layer behind the silver halide emulsion layer (as seen in the direction of the incident light during exposure) to ensure maximum sensitivity.

The developer oxidation products formed during the development of a silver halide emulsion should of course only act on the associated dye-giving compound. Accordingly, the photosensitive element generally contains separation layers which effectively prevent the developer oxidation products from diffusing into other non-associated layers. These separation layers may for example contain suitable substances which react with the developer oxidation products, for example non-diffusible hydroquinone derivatives, or if the developer is a colour developer, non-diffusible colour couplers. In one preferred embodiment, therefore, the photosensitive element has the following structure (going downwards):

blue-sensitive silver halide emulsion layer,
layer containing a non-diffusible compound releasing a diffusible yellow dye
separation layer
green-sensitised silver halide emulsion layer
layer containing a non-diffusible compound which releases a diffusible purple dye
separation layer
red-sensitized silver halide emulsion layer
layer containing a non-diffusible compound releasing a diffusible blue-green dye.

The silver halide emulsion layers may of course also be arranged in a different order, although in this case the associated layers containing the colouring systems must also be changed around so that the association remains intact.

The light-impermeable layer arranged below the photosensitive element is permeable to aqueous alkaline treatment solutions and, hence, to the diffusible dyes. It has essentially two functions. Firstly, it is used to mask the image silver left after development in the originally photosensitive element, and the dye-giving compounds left behind as colour negative, so that it is only the positive dye transfer image which is visible through the transparent layer substrate of the photosensitive part. Secondly, it seals off the photosensitive element on the side of the image-receiving layer (downwards) in light-tight manner. This is of particular significance in cases where, after exposure, the one-sheet material is intended to be brought into contact with the alkaline processing mass in the camera itself, subsequently removed from the camera and developed outside the camera.

Layers with adequate impermeability to light but with adequate permeability to diffusible dyes may be prepared for example with suspensions of inorganic or organic dark-coloured, preferably black pigments, for example with suspensions of carbon black in suitable binders, for example in gelatin solutions. In general, layers which are 0.5 to $2\mu$ thick and which contain from 10 to 90% by weight (based on the total dry weight) of carbon black in gelatin are generally sufficient for guaranteeing the exclusion of light during development to an adequate extent. The particle size of the pigments used is relatively non-critical providing it does not appreciably exceed $0.5\mu$.

In addition to the black pigment layer, the light-impermeable layer preferably comprises a white pigment layer arranged below the black pigment layer. The function of this white pigment layer is to cover the black layer and to provide a white background for the image. Any white pigments may be used for this purpose providing they have an adequate covering power in not excessive layer thicknesses. Examples of suitable white pigments are barium sulphate, oxides of zinc, titanium, silicon, aluminium and zirconium, and also barium stearate or kaolin. Titanium dioxide is preferably used as the white pigment. The white pigment used has to satisfy the same requirements as the black pigments in regard to binder, concentration and particle size. The thickness of the white pigment layer may be varied according to the required whiteness of the background. The white pigment is preferably used in layer thicknesses of from 5 to 20µ.

Instead of the light-impermeable layer, it is also possible in accordance with the invention to arrange in the one-sheet material means for producing a light-impermeable layer of this kind between the photosensitive element and the image-receiving layer, for example in the form of a laterally arranged container with a working liquid containing a clouding agent (pigment) which, under the effect of mechanical forces, releases its contents between the above-mentioned layers so that a pigment layer of the kind in question is formed between them.

The image-receiving layer consists essentially of a binder containing dye mordants for fixing the diffusible dyes.

Preferred mordants for acid dyes are long-chain quaternary ammonium or phosphonium compounds or ternary sulphonium compounds, for example those described in U.S. Pat. Nos. 3,271,147 and 3,271,148. It is also possible to use certain metal salts and their hydroxides which form substantially insoluble compounds with the acid dyes. The dye mordants are dispersed in the receiving layer in one of the usual hydrophilic binders, for example in gelatin, polyvinyl pyrrolidone completely or partially hydrolysed cellulose ethers and the like. Some binders may of course also function as mordants, for example copolymers or polymer mixtures of vinyl alcohol and N-vinyl pyrrolidone, of the type described for example in DT-AS 1,130,284, and also polymers of nitrogen-containing quaternary bases, for example polymers of N-methyl-2-vinyl pyridine, of the type described for example in U.S. Pat. No. 2,484,430. Other suitable mordanting binders are, for example, guanyl hydrazone derivatives of acyl styrene polymers, of the type described for example in DT-OS 2,009,498. In general, however, other binders, for example gelatin, will generally be added to the last of the above-mentioned binders.

Suitable transparent layer substrates for the one-sheet material according to the invention are any of the transparent substrates commonly used in photography, for example films of cellulose esters, polyethylene terephthalate, polycarbonate or other film-forming polymers.

A relatively high pH-value (approximately 11 to 14) is adjusted by the alkaline processing mass in the photosensitive material, thus initiating development and imagewise dye diffusion. It has been found that the dyes and, hence, the images obtained are not particularly stable at this high pH-value. Accordingly, the material has to be made substantially neutral or weakly acid on completion of development. This can be done in known manner by providing the material with an additional, acid polymer layer which becomes accessible only gradually to the alkaline processing mass during development. In the context of the invention, an acid polymer layer is a binder layer containing polymeric compounds with acid groups, preferably sulpho or carboxyl groups. These acid groups react with the cations of the processing mass to form salts and, in doing so, reduce the pH-value of the mass. The polymeric compounds and, hence, the acid groups are of course incorporated in non-diffusible form in the above-mentioned layer. In many cases, the acid polymers are derivatives of cellulose or derivatives of polyvinyl compounds, although it is also possible to use other polymeric compounds. Examples of suitable acid polymers include cellulose derivatives with a free carboxyl group, for example cellulose dicarboxylic acid semiesters with a free carboxyl group, such as cellulose acetate hydrogen phthalate, cellulose acetate hydrogen glutarate, ethyl cellulose acetate hydrogen succinate, cellulose acetate hydrogen succinate hydrogen phthalate, ethers and esters of cellulose modified with further dicarboxylic acid anhydrides or with sulphonic acid anhydrides, for example with o-sulphobenzoic acid anhydride, carboxyl methyl cellulose, also polystyrene sulphonic acid, polyvinyl hydrogen phthalate, polyvinyl acetate hydrogen phthalate, polyacrylic acid, acetals of polyvinyl alcohol with aldehydes which are substituted by carboxy or sulpho groups, such as o-, m- or p-benzaldehyde sulphonic acid or carboxylic acid, partially esterified ethylene/maleic acid anhydride copolymers, partially esterified methyl vinyl ether/maleic acid anhydride copolymers and the like.

The acid polymer layer must contain a sufficient quantity of acid groups to reduce the pH-value of the processing mass from its original level of 11 to 14 to such an extent that, finally, the material is either substantially neutral or weakly acid (pH-value 5 to 8).

The delay in pH-reduction is obtained in known manner by coating the acid polymer layer with a so-called retarding layer. This retarding layer is an alkali-permeable layer which preferably consists of a polymer inert to alkali, for example polyvinyl alcohol or a partially acetalised polyvinyl alcohol. The delay in pH-reduction may be adjusted as required by suitably selecting the thickness and composition of this retarding layer. A retarding layer containing polymers with novel permeability behaviour is described, for example, in German Patent Application P 24 55 762.8.

Neutralisation systems, which are combinations of an acid polymer layer and a retarding layer, are described for example in DT-PS 1,285,310. Layer combinations of this kind may be present in the material according to the invention, for example in the photosensitive part between the transparent layer substrate and the image-receiving layer. Another possibility is to arrange the neutralisation system of an acid polymer layer and a retarding layer on the cover sheet. These two layers must of course be arranged in such an order that the alkali in the processing mass has first to penetrate through the retarding layer in order to reach the acid polymer layer.

The dye diffusion transfer process according to the invention may be carried out advantageously in or by means of a suitable self-developer camera. This camera may be provided, for example, with devices by which it is possible, after exposure of the photosensitive element, to distribute a working solution between the photosensitive element and the cover sheet, and to mask the photosensitive material in such a way that it is impermeable to light from above. A camera of this kind is preferably provided with two squeezing rollers in contact with one another between which the one-sheet material is pulled out, thereby splitting open a laterally arranged container so that it releases its contents between the layers of the one-sheet material.

Since, after passing through the squeezing rollers, the photosensitive element is protected on both sides against undesirable exposure by light-impermeable layers, the exposed material may be pulled out of the camera immediately after the beginning of development.

For processing the one-sheet material after it has been exposed imagewise, the photosensitive element is brought into contact with the aqueous alkaline working solution. The silver halide emulsion layers exposed imagewise are developed in the presence of the developer compound, an imagewise distribution of oxidation products of the developer compound being obtained in consistency with the positive silver image formed. These oxidation products oxidise the associated colouring compound which releases the diffusible dye by reacting with the alkali of the activator. The aqueous alkaline working solution may contain viscosity-increasing additives, for example hydroxy ethyl cellulose. The working solution may also contain in known manner development accelerators, stabilisers, silver salt solvents, fogging agents, antioxidants and other additives.

EXAMPLE 1

A photosensitive element of a photographic material according to the invention was prepared by successively applying the following layers to a transparent substrate of polyester film. The quantities indicated are each based on 1 square meter.
(1) A mordant layer consisting of 3.6 g of octadecyl trimethyl ammonium methyl sulphate and 9.0 g of gelatin,
(2) A reflection layer of 48 g of $TiO_2$ and 4.8 g of gelatin,
(3) A gelatin intermediate layer of 2.6 g of gelatin,
(4) A dye layer with silver sulphide grains of 1.25 g. of compound 1 (yellow) and 3.35 g of gelatin,
(5) A silver bromide emulsion layer having incorporated therein a black-and-white developer and consisting of 0.95 g of AgBr, 1.2 g of octadecyl hydroquinone sulphonic acid, 0.36 g of octadecyl hydroquinone and 2.2 g of gelatin, and
(6) A protective layer of 2.6 g of gelatin.

After exposure through a stepped wedge, the photosensitive element was covered on the layer side with a polyester film. A splittable container with an alkaline working liquid of the following composition was used for developing the imagewise exposed photosensitive element:
25 g of sodium hydroxide
1 g of phenidone
2 g of sodium thiosulphate
4 g of sodium sulphite
1 g of paraformaldehyde
10 ml of benzyl alcohol
30 g of Natrosol HHK 250 (hydroxy ethyl cellulose) made up with water to 1000 ml.

The image set was guided through a pair of squeezing rollers so that the developer paste was distributed between the photosensitive element and the cover sheet. The paste thickness was 140μ. In order to adjust the thickness of the paste, spacer strips of corresponding thickness were arranged laterally along the edge of the image between the photosensitive element and the cover sheet. After an exposure time of 10 minutes at 20° C., the image element was separated off and freed from the paste adhering to it. A positive yellow dye image of good colour quality was visible through the transparent substrate with the $TiO_2$-layer as image background.

EXAMPLE 2

The procedure was repeated as described in Example 1, except that, instead of layers (4) and (5), the following layers were applied:
(4) A dye layer with silver sulphide grains of 0.83 g of compound 2 (magenta) and 2.85 g of gelatin
(5) A green-sensitised silver bromide emulsion layer of 0.67 g of AgBr, 0.83 g of octadecyl hydroquinone sulphonic acid, 0.25 g of octadecyl hydroquinone and 1.5 g of gelatin.

A positive magenta dye image was obtained after processing in the same way as in Example 1. Dmin 0.65; Dmax 1.62.

EXAMPLE 3

The procedure was repeated as described in Example 1, except that, instead of layers (4) and (5), the following layers were applied:
(4) A dye layer with silver sulphide grains of 1.6 g of compound 3 (cyan) and 2.2 g of gelatin
(5) A red-sensitised silver bromide emulsion layer of 1.65 g of AgBr, 1.2 g of octadecyl hydroquinone sulphonic acid, 0.35 g of octadecyl hydroquinone and 2.0 g of gelatin.

A positive cyan dye image of good colour quality was obtained after processing in the same way as in Example 1.

EXAMPLE 4

The procedure was repeated as described in Example 2, except that compound 2 in layer 4 was replaced by compounds 4, 5 and 9. Positive magenta dye images were obtained in each case after processing in the same way as in Example 1.

EXAMPLE 5

The photosensitive material described in Example 2, was developed in the same way as in Example 1, except that, instead of phenidone, the compounds identified below were used as auxiliary developers. They were each used in a quantity of 5 g per liter of paste. The following results were obtained:

| Auxiliary developer | Dmin | Dmax |
| --- | --- | --- |
| N-ethyl-N-hydroxy ethyl-p-phenylene diamine | 0.55 | 1.31 |
| N-methyl aminophenol | 0.45 | 1.67 |
| Pyrocatechol | 0.49 | 1.58 |
| p-tolyl hydroquinone | 0.77 | 1.56 |
| Piperidinohexose reductone monoacetate | 0.53 | 1.56 |
| 1-phenyl-4-methyl-4-hydroxy methyl-3-pyrazolidone | 0.51 | 1.67 |

EXAMPLE 6

The following layers were applied to the substrate described in Example 1 (transparent substrate, layers 1, 2 and 3):
- (4) A dye layer with silver sulphide grains of 1.6 g of compound 8(cyan) and 2.2 g of gelatin,
- (5) A red-sensitised silver bromide emulsion layer of 1.57 g of AgBr, 1.12 g of octadecyl hydroquinone sulphonic acid, 0.34 g of octadecyl hydroquinone and 1.95 g of gelatin,
- (6) A barrier layer of silver sulphide grains 1.0 g of octadecyl hydroquinone sulphonic acid and 4.0 g of gelatin,
- (7) A dye layer with silver sulphide grains of 0.94 g of compound 7 (magenta) and 2.85 g of gelatin,
- (8) A green-sensitised silver bromide emulsion layer of 1.57 g of AgBr, 1.12 g of octadecyl hydroquinone sulphonic acid, 0.34 g of octadecyl hydroquinone and 1.95 g of gelatin,
- (9) A barrier layer identical with layer (6),
- (10) A dye layer of 1.48 g of compound 6 (yellow) and 2.85 g of gelatin,
- (11) A silver bromide emulsion layer of 1.65 g of AgBr 1.2 g of octadecyl hydroquinone sulphonic acid, 0.35 g of octadecyl hydroquinone and 2.0 g of gelatin, and
- (12) A protective layer of 2.6 g of gelatin.

A strip of the image element was exposed through a colour separation wedge and subsequently processed in the same way as described in Example 1. With a paste thickness of 260μ, a direct-positive multicoloured reproduction of the original was obtained after a development time of 20 minutes.

EXAMPLE 7

The following layers were applied to the substrate described in Example 1 (transparent substrate, layers 1, 2 and 3):
- (4) A dye layer of 1.25 g of compound 1 (yellow) and 1.35 g of gelatin,
- (5) A blue-sensitised emulsion layer with an unfogged direct-positive silver chloride bromide emulsion, silver covering 2.0 g, gelatin 1.8 g, and
- (6) A protective layer of 2.6 g of gelatin.

A strip of the photosensitive element was exposed and subsequently developed in conjunction with a paste bag, a cover sheet and two laterally arranged spacer strips, in the same way as described in Example 1. The spacer strips had a thickness of 180μ. A paste of the following composition was used as developer:

25 g of potassium hydroxide
5 g of N,N,N',N'-tetramethyl-p-phenylene diamine
1 g of acetyl phenyl hydrazine
1 g of paraformaldehyde
0.1 g of benzotriazole
10 ml of benzyl alcohol
35 g of Natrosol HHR 250 (hydroxy ethyl cellulose) made up with water to 1000 ml.

A positive yellow dye image of good colour quality was obtained after a development time of 10 minutes.

EXAMPLE 8

The procedure was repeated as described in Example 7, except that, instead of layers (4) and (5), the following layers were applied:
- (4) A dye layer of 0.83 g of compound 2 magenta and 1.85 g of gelatin, and
- (5) A green-sensitised emulsion layer with an unfogged direct-positive silver chloride bromide emulsion, silver covering 2.0 g, gelatin 1.8 g.

A positive magenta dye image was obtained after processing in the same way as in Example 7. Dmin 0.38, Dmax 1.24.

EXAMPLE 9

The procedure was repeated as described in Example 7, except that, instead of layers (4) and (5), the following layers were applied:
- (4) A dye layer of 1.6 g of compound 3 (cyan) and 1.2 g of gelatin, and
- (5) A red-sensitised emulsion layer with an unfogged direct-positive silver chloride bromide emulsion, silver covering 2.0 g, gelatin 1.8 g.

A positive cyan dye image was obtained after processing in the same way as in Example 7.

EXAMPLE 10

The procedure was repeated as described in Example 8, except that the compound in layer 4 was replaced by compounds 4, 5 and 9. Positive magenta dye images were obtained in each case after processing in the same way as in Example 7.

EXAMPLE 11

The following layers were applied to the substrate described in Example 1 (transparent substrate, layers 1, 2 and 3):
- (4) A dye layer of 1.6 g of compound 8 (cyan) and 2.2 g of gelatin,
- (5) A red-sensitised emulsion layer with an unfogged direct-positive silver chloride bromide emulsion, silver covering 2.0 g, gelatin 1.8, g
- (6) A barrier layer of 0.26 g of octadecyl hydroquinone sulphonic acid and 2.26 g of gelatin,
- (7) A dye layer of 0.94 g of compound 7 magenta and 2.85 g of gelatin,
- (8) A green-sensitised emulsion layer with an unfogged direct-positive silver chloride bromide emulsion, silver covering 2.0 g, gelatin 1.8, g
- (9) A barrier layer identical with layer (6),
- (10) A dye layer of 1.48 g of compound 6 (yellow) and 2.85 g of gelatin,
- (11) A blue-sensitised emulsion layer with an unfogged direct-positive silver chloride bromide emulsion, silver covering 2.0 g, gelatin 1.8 g, and
- (12) A protective layer of 2.6 g of gelatin.

A strip of the image element was exposed through a colour separation wedge and subsequently processed in the same way as described in Example 7. With a paste thickness of 260μ, a direct-positive multicoloured reproduction of the original was obtained after a development time of 20 minutes.

EXAMPLE 12

The following layers were applied to the substrate described in Example 1 (transparent substrate, layers 1, 2 and 3):
- (4) A dye layer with 0.83 g of compound 2 (magenta) and 2.8 g of gelatin,
- (5) A silver bromide emulsion layer of 1.6 g of AgBr and 2.0 g of gelatin, and
- (6) A protective layer of 2.6 g of gelatin.

The material was exposed and processed in the same way as described in Example 1. A paste of the following composition was used as developer:

25 g of sodium hydroxide
10 ml of benzyl alcohol
1 g of paraformaldehyde
0.1 g of benzotriazole
0.25 g of ascorbic acid
5 g of N,N,N',N'-tetramethyl-p-phenylene diamine
35 g of Natrosol HHR 250 made up with water to 1 liter.

With a paste thickness of 180µ, a magenta-coloured negative reproduction of the original was obtained after a development time of 10 minutes.

What is claimed is:

1. The process of producing colored photographic images by the dye diffusion transfer process comprising the steps of:
   (a) imagewise exposing a photographic material containing at least one light-sensitive silver halide emulsion layer and associated therewith a non-diffusible color-providing compound capable of being oxidized by oxidized silver halide developer and, in oxidized form, of being split in alkaline medium to release a diffusible dye-providing radical having a free sulfonamide group,
   (b) developing the material with an alkaline silver halide developer to release an image distribution of diffusible dye and
   (c) transferring the image distribution of diffusible dye to an image-receiving layer, wherein the improvement comprises the dye-giving compound corresponds to the following formula:

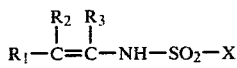

in which
   X represents the diffusible dye-providing radical;
   $R_1$ represents $-OR_4$ or $NHR_5$ where $R_4$ is hydrogen or a acyl radical that may be hydrolyzed under the conditions of photographic development and $R_5$ is hydrogen, alkyl, aryl, acyl or a heterocyclic group, wherein said $R_4$ acyl radical and $R_5$ alkyl, aryl, acyl and heterocyclic radicals include such radicals which together with one of the substituents $R_2$ and $R_3$ complete a 5-, 6- or 7-membered heterocyclic ring containing at least one oxygen or nitrogen atom;
   $R_2$ represents hydrogen, alkyl, aryl or a heterocyclic group including such alkyl, aryl and heterocyclic radicals which together with one of the substituents $R_1$ and $R_3$ complete a 5-, 6- or 7-membered heterocyclic ring, or a nitrogen atom carrying two substituents; the first substituent is a radical selected from the group consisting of hydrogen, alkyl, aryl and acyl including such alkyl, aryl and acyl radicals which together with $R_1$ complete a 5-, 6- or 7-membered heterocyclic ring containing at least one nitrogen atom; the second substituent is a radical selected from the group consisting of hydrogen and a radical that together with $R_3$ completes a 5-, 6- or 7-membered heterocyclic ring containing at least one nitrogen atom; but the two substituents at the nitrogen atom are not both at the same time hydrogen; and $R_3$ represents hydrogen, alkyl, aryl, a heterocyclic group, acyl, cyano or a radical that together with one of the substituents $R_1$ and $R_2$ completes a 5, 6- or 7-membered heterocyclic ring;
   at least one of the substituents $R_1$, $R_2$ and $R_3$ or a heterocyclic ring completed by two of these substituents carries a ballasting radical and the released diffusible dye-providing radical has a free sulfonamide group.

2. The process as claimed in claim 1 in which the non-diffusible color-providing compound is of the following formula II

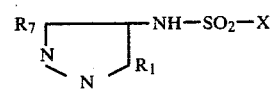

X represents the dye-providing radical;
   $R_1$ represents $-OR_4$ or $-NHR_5$ where $R_4$ is hydrogen or a acyl radical that may be hydrolysed under the conditions of photographic development and $R_5$ is hydrogen or alkyl, aryl, acyl or a heterocyclic radical, said $R_4$ acyl radical and $R_5$ radicals including such alkyl, aryl, acyl and heterocyclic radicals which together with the substituent $R_6$ complete a 5- or 6-membered heterocyclic ring containing at least one nitrogen atom;
   $R_6$ represents aryl or acyl;
   $R_7$ represents alkyl, alkoxy, acylamino or arylamino;
   at least one of the substituents $R_6$ and $R_7$ carries a ballasting radical.

3. The process as claimed in claim 2 in which $R_1$ and $R_6$ complete a benzimidazoline or quinazolone ring.

4. The process as claimed in claim 1 in which the non-diffusible color-providing compound is of the following formula III

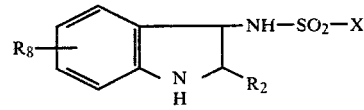

in which
   $R_2$ represents hydrogen, alkyl, aryl or a heterocyclic group, and
   $R_8$ represents one or more substituents selected from the group consisting of alkyl, alkoxy, halogen, sulfo or sulfamoyl in which one or two of the hydrogens on the nitrogen may be substituted by alkyl or aryl;
   at least one of the substituents $R_2$ and $R_8$ carries a ballasting radical.

* * * * *

UNITED STATES PATENT OFFICE
CERTIFICATE OF CORRECTION

Patent No. 4,198,235          Dated April 15, 1980

Inventor(s) Vetter et al

It is certified that error appears in the above-identified patent and that said Letters Patent are hereby corrected as shown below:

Column 25, last line, "dispersion" should be --diffusion--;

Column 27, line 53, "forming" should be --fogging--;

Column 38, claim 2, in the ring of the structural formula, bond lines should be added at each side and $-R_6$ should be added to the lower -N- in the structural formula so that the ring appears as follows:

-- 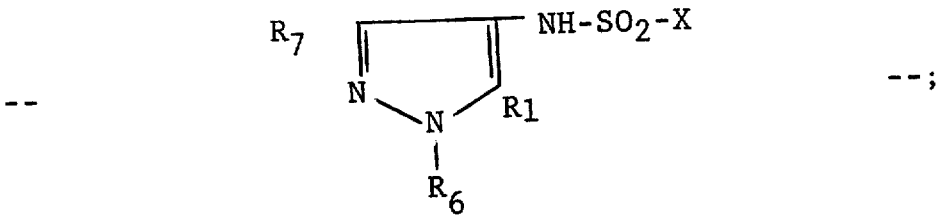 --;

Column 38, claim 4, in the ring at the right side and at the bottom between -N- and H in the structural formula, bond lines should be added so that it appears as follows:

UNITED STATES PATENT OFFICE
CERTIFICATE OF CORRECTION

Patent No. 4,198,235   Dated April 15, 1980

Inventor(s) Vetter et al

It is certified that error appears in the above-identified patent and that said Letters Patent are hereby corrected as shown below:

-- 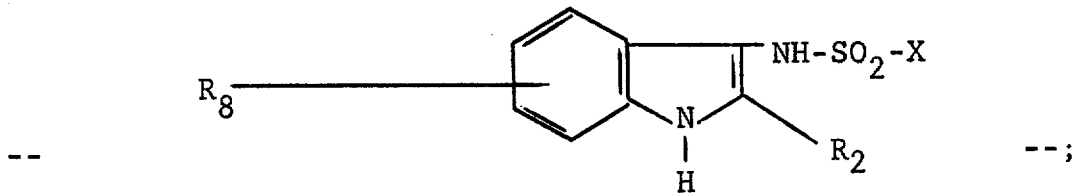 --;

Signed and Sealed this

Twenty-eighth Day of October 1980

[SEAL]

Attest:

SIDNEY A. DIAMOND

Attesting Officer   Commissioner of Patents and Trademarks